No. 723,796. PATENTED MAR. 24, 1903.
F. L. WILLIAMS.
SHAKER OR MIXER.
APPLICATION FILED JAN. 19, 1903.
NO MODEL.
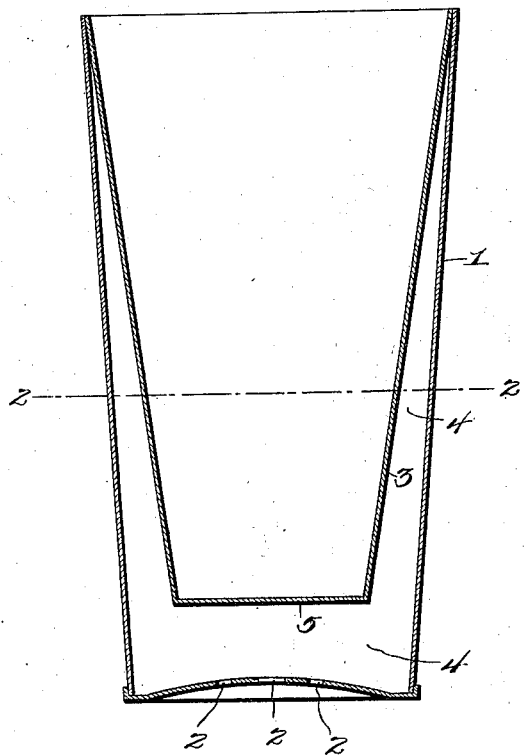
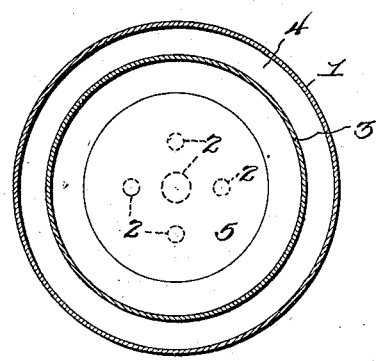
Witnesses
T. L. Cochane
P. H. Birckhead.
Inventor
Frank L. Williams,
by Howson & Howson,
Attorneys

UNITED STATES PATENT OFFICE.

FRANK LESLIE WILLIAMS, OF NASHVILLE, TENNESSEE.

SHAKER OR MIXER.

SPECIFICATION forming part of Letters Patent No. 723,796, dated March 24, 1903.

Application filed January 19, 1903. Serial No. 139,637. (No model.)

*To all whom it may concern:*

Be it known that I, FRANK LESLIE WILLIAMS, a citizen of the United States, and a resident of Nashville, Davidson county, State of Tennessee, have invented certain new and useful Improvements in Shakers or Mixers, of which the following is a specification.

My invention relates to improvements in shakers or mixers particularly applicable for use in mixing beverages—as, for example, in shaking liquids combined with a cooling or heating agent to impart an abnormal temperature thereto and especially wherein ice is employed for imparting a cold temperature to the liquid; and my primary object is to provide an improved shaker or mixer which can be readily manipulated without chilling the hands or subjecting them to uncomfortable temperature and one in which when lumps of ice are used the outside will not become battered or indented by violent contact with such solid particles and finally to provide a shaker or mixer which will more efficiently perform the service intended by reason of the comfort in handling, thereby inducing the manipulator to more thoroughly perform the mixing operation than heretofore.

With these objects in view my invention consists in the novel construction of shaker and in the details thereof, as hereinafter described with reference to the accompanying drawings, and more particularly pointed out in the claim.

In the drawings, Figure 1 is a longitudinal vertical section of my improved shaker; and Fig. 2 is a transverse section thereof on the line 2 2, Fig. 1.

Referring to the drawings, in which the same reference characters relate to the same or corresponding parts in both views, my improved shaker or mixer consists of an outer vessel 1, preferably of frusto-conoidal shape, the bottom of which is provided with perforations 2 for the circulation of air between the outer and inner vessels. Within this outer vessel is secured by brazing, soldering, or other suitable means a similarly-shaped inner vessel 3, having an imperforate bottom 5 and smaller in size than the vessel 1, thereby providing a space 4 around its sides and bottom of sufficient volume to permit the access of the desired quantity of air of the temperature of the surrounding atmosphere, which will be of a sufficiently high temperature to keep the outer vessel at a comfortable temperature, at least one which can be easily borne by the hands. This body of air which enters through the perforations 2 constitutes an efficient non-conducting medium, which prevents the transmission of abnormal temperature from the inner vessel to the hands of the manipulator as the latter grasps the outer vessel. When mixing cold beverages, it will be seen that the hands are prevented from becoming chilled, because the outside will always remain sufficiently warm, and thus bartenders and others are protected from exposure to rheumatism and other diseases arising from sudden chills, and similarly protection is afforded against very hot temperatures, where the liquid in the mixing vessel 3 is very hot, as may be the case when hot beverages are mixed. Moreover, the outer vessel never becomes battered by contact of lumps of ice against its side, because these come in contact with the inner vessel only, and thereby the appearance of the device is maintained and the manipulator will be more likely to give the necessary amount of time to the shaking, thus not only more thoroughly mixing the ingredients, but producing a colder beverage and giving greater satisfaction to the patrons. Finally, condensation of moisture will take place, not on the walls of the receptacle in contact with the hands, as heretofore, but upon the outer periphery of the inner vessel and the inner periphery of the outer vessel, and such condensed liquid will flow downwardly and outwardly through the perforated outer bottom.

I claim as my invention—

As a new article of manufacture, the herein-described shaker or mixer, consisting of an outer vessel adapted to be grasped by the hands and having a perforated bottom for the free circulation of air, an inner vessel having an imperforate bottom and supported within said outer vessel and providing a non-conducting space around the sides and bottom of said inner vessel, substantially as described.

In testimony whereof I have signed my name to this specification in the presence of two subscribing witnesses.

FRANK LESLIE WILLIAMS.

Witnesses:
JOHN RUHM,
HENRY H. COOK.